US007284611B2

(12) United States Patent
Reddy et al.

(10) Patent No.: US 7,284,611 B2
(45) Date of Patent: Oct. 23, 2007

(54) METHODS AND COMPOSITIONS FOR CONTROLLING LOST CIRCULATION IN SUBTERRANEAN OPERATIONS

(75) Inventors: B. Raghava Reddy, Duncan, OK (US); Donald L. Whitfill, Kingwood, TX (US); Krishna M. Ravi, Kingwood, TX (US); Mark R. Savery, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 30 days.

(21) Appl. No.: 10/982,016

(22) Filed: Nov. 5, 2004

(65) Prior Publication Data

US 2006/0096759 A1    May 11, 2006

(51) Int. Cl.
*E21B 33/138* (2006.01)
*E21B 21/00* (2006.01)

(52) U.S. Cl. .................. 166/295; 166/292; 175/72
(58) Field of Classification Search .................. 175/72, 175/66; 166/292, 291, 294, 295; 507/269
See application file for complete search history.

(56) References Cited

U.S. PATENT DOCUMENTS

| | | | | |
|---|---|---|---|---|
| 2,912,380 A | * | 11/1959 | Groves ...................... | 507/112 |
| 3,042,608 A | | 7/1962 | Morris ....................... | 252/8.5 |
| 4,005,753 A | * | 2/1977 | Scheffel et al. ............ | 166/283 |
| 4,234,344 A | | 11/1980 | Tinsley et al. ............... | 106/88 |
| 4,515,216 A | | 5/1985 | Childs et al. ............... | 166/293 |
| 4,579,668 A | | 4/1986 | Messenger ................. | 507/118 |
| 5,403,822 A | | 4/1995 | Mueller et al. ............. | 507/138 |
| 5,456,751 A | | 10/1995 | Zandi et al. ................ | 106/724 |
| 5,779,787 A | | 7/1998 | Brothers et al. ............ | 106/802 |
| 5,826,669 A | | 10/1998 | Zaleski et al. ................ | 175/72 |
| 5,913,364 A | | 6/1999 | Sweatman ................... | 166/281 |
| 6,060,434 A | | 5/2000 | Sweatman et al. .......... | 507/216 |
| 6,105,674 A | | 8/2000 | Liao et al. .................. | 166/292 |
| 6,133,203 A | | 10/2000 | Estes et al. ................. | 507/209 |
| 6,152,227 A | | 11/2000 | Lawson et al. ............. | 166/293 |
| 6,258,757 B1 | | 7/2001 | Sweatman et al. .......... | 507/219 |

(Continued)

OTHER PUBLICATIONS

Halliburton brochure entitled "Bengum Squeeze Lost-Circulation Material" dated 2000.

(Continued)

*Primary Examiner*—William Neuder
*Assistant Examiner*—Nicole A Coy
(74) *Attorney, Agent, or Firm*—Craig W. Roddy; Baker Botts (57) ABSTRACT

A lost circulation composition, that comprises a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein the lost circulation composition has a multimodal particle size distribution, is provided, wherein resilient particles, particles comprising a thermoset polymer laminate, or a combination thereof are present in the lost circulation composition in an amount of at least about 20% by weight of the lost circulation composition, is provided. Drilling fluids, methods of controlling lost circulation, and methods of increasing an effective fracture gradient while drilling also are provided.

53 Claims, 3 Drawing Sheets

U.S. PATENT DOCUMENTS

| | | | |
|---|---|---|---|
| 6,312,515 B1 | 11/2001 | Barlet-Gouedard et al. | 106/709 |
| 6,508,305 B1 | 1/2003 | Brannon et al. | 166/293 |
| 6,508,306 B1 | 1/2003 | Reddy et al. | 166/295 |
| 6,581,701 B2 | 6/2003 | Heying | 175/72 |
| 6,645,288 B1 | 11/2003 | Dargaud et al. | 106/696 |
| 6,656,265 B1 | 12/2003 | Garnier et al. | 106/713 |
| 6,689,208 B1 | 2/2004 | Brothers | 106/794 |
| 6,702,044 B2 | 3/2004 | Reddy et al. | 175/64 |
| 6,729,405 B2 | 5/2004 | DiLullo et al. | 166/292 |
| 6,742,592 B1 | 6/2004 | Le Roy-Delage et al. | 166/293 |
| 6,770,604 B2 | 8/2004 | Reddy et al. | 507/224 |
| 6,806,232 B1 | 10/2004 | Cart | 507/118 |
| 6,874,578 B1 | 4/2005 | Garner et al. | 166/293 |
| 6,902,001 B2 | 6/2005 | Dargaud et al. | 166/293 |
| 6,902,002 B1 | 6/2005 | Chatterji et al. | 166/293 |
| 6,907,929 B2 | 6/2005 | Leroy-Delage et al. | 166/293 |
| 7,055,603 B2 | 6/2006 | Caveny et al. | 166/294 |
| 7,229,492 B2 | 6/2007 | Chatterji et al. | 106/724 |
| 2003/0008778 A1 | 1/2003 | Donaldson et al. | 507/100 |
| 2003/0092582 A1 | 5/2003 | Reddy et al. | 507/100 |
| 2003/0132000 A1 | 7/2003 | Shaarpour | 166/294 |
| 2003/0186819 A1 | 10/2003 | Shaarpour | 507/200 |
| 2004/0040712 A1 | 3/2004 | Ravi et al. | 166/293 |
| 2004/0055748 A1 | 3/2004 | Reddy et al. | 166/293 |
| 2004/0118561 A1 | 6/2004 | Heathman et al. | 166/292 |
| 2004/0144537 A1 | 7/2004 | Reddy et al. | 166/292 |
| 2004/0163812 A1 | 8/2004 | Brothers | 166/293 |
| 2004/0168802 A1 | 9/2004 | Creel et al. | 166/293 |
| 2004/0171499 A1 | 9/2004 | Ravi et al. | 507/200 |
| 2004/0198872 A1 | 10/2004 | Reddy et al. | 524/3 |
| 2004/0206501 A1 | 10/2004 | Brothers et al. | 166/292 |
| 2004/0224852 A1* | 11/2004 | Halliday et al. | 507/140 |
| 2004/0244978 A1* | 12/2004 | Shaarpour | 166/293 |
| 2005/0120920 A1 | 6/2005 | Brothers | 106/814 |

OTHER PUBLICATIONS

Halliburton brochure entitled "Bentonite Cement Diesel Oil Slurry (BCDO) Lost-Circulation Material" dated 2000.

Halliburton brochure entitled "FlexPlug® OBM Lost-Circulation Material" dated 1999.

Halliburton brochure entitled "FlexPlug® W Lost-Circulation Material" dated 1999.

Halliburton brochure entitled "Flocele Lost-Circulation Additive" dated 1999.

Halliburton brochure entitled Flo-Chek® Service Lost-Circulation Service dated 2000.

Halliburton brochure entitled "Gilsonte Lost-Circulation Additive" dated 1999.

Halliburton brochure entitled "Granulite TR ¼ Lost-Circulation Additive" dated 1999.

Halliburton brochure entitled Tuf Additive No. 2 Service Lost-Circulation Additive dated 1999.

SPE 59059 entitled "In-Situ Reactive System Stops Lost Circulation And Underground Flow Problems In Several Southern Mexico Wells" by Francisoc Rueda and Raul Bonifacio, presented Feb. 1-3, 2000.

SPE 56499 entitled "New Solutions For Subsalt-Well Lost Circulation And Optimized Primary Cementing" by R. Sweatman; R. Faul and C. Ballew, presented Oct. 3-6, 1999.

SPE/IADC 37671 entitled "New Solutions to Remedy Lost Circulation, Crossflows, and Underground" by Ronald E. Sweatman; Calvin W. Kessler; And John M. Hillier, presented Mar. 4-6, 1997.

Paper entitled "New Fluids and Processes Stabilize Wellbores During Drilling Operations For Lower-Cost Well Construction and Enhanced Production" by Ron Sweatman; James Heathman, Ronnie Faul and Anthony Badalamenti, presented Mar. 30-31, 1999.

Baroid brochure entitled "BARACARB® Bridging Agent" dated 2002.

Baroid brochure entitled "BAROFIBRE® Lost Circulation and Seepage Loss Additive" dated 2003.

Baroid brochure entitled "DRILTREAT® Oil Wetting Agent" dated 2000.

Baroid brochure entitled "EZ MUL® NT" dated 2004.

Halliburton brochure entitled "Kwik-Seal® Lost Circulation Additive" dated 2002.

Halliburton brochure entitled "STEELSEAL® Designed for Lost Circulation Prevention in Water-Based, Synthetic and Oil-Based Drilling Fluids in Porous and Fractured Zones" dated 2001.

* cited by examiner

METHODS AND COMPOSITIONS FOR CONTROLLING LOST CIRCULATION IN SUBTERRANEAN OPERATIONS

BACKGROUND

The present invention relates to subterranean operations. More particularly, the present invention relates to lost circulation compositions and methods of using such lost circulation compositions.

During the drilling of a well bore, a drilling fluid may be circulated down through the inside of the drill string, through the drill bit, and to the surface through the arnnulus between the walls of the well bore and the drill string. The drill string may be a drill pipe, a casing string, or any other suitable conduit. Among other things, the circulating drilling fluid lubricates the drill bit, carries drill cuttings to the surface, and balances the formation pressure exerted on the well bore. One problem associated with the drilling of a well bore may be the undesirable loss of large amounts of the drilling fluid into the subterranean formation. This problem may be referred to as "lost circulation" and the sections of the formation into which the drilling fluid may be lost may be referred to as "lost circulation zones." The loss of drilling fluid into the formation is undesirable, inter alia, because of the expense associated with the drilling fluid lost into the formation. In addition to drilling fluids, problems with lost circulation may also be encountered with other fluids, for example, spacer fluids, completion fluids (e.g., completion brines) and workover fluids that may be circulated in a well bore. A variety of factors may be responsible for lost circulation. For example, the subterranean formation penetrated by the well bore may be highly permeable or may contain fractures or crevices therein. Furthermore, the formation may breakdown under the hydrostatic pressure applied by the fluid, thereby allowing the fluid to be lost into the formation. For instance, fractures in the subterranean formation may be created or enhanced due to the hydrostatic pressure of the drilling fluid with the resulting loss of drilling fluid into those fractures. As referred to herein, the "effective fracture gradient," refers to the minimum hydrostatic pressure plus frictional losses that may be required to create or enhance a fracture in a potential lost circulation zone.

A number of methods have been developed to control lost circulation. One method involves the introduction of a settable composition into a problematic zone to prevent and/or reduce the flow of the drilling fluid into the lost circulation zone. However, this method may require an undesired interruption in the drilling process. Another method commonly used to control lost circulation involves the placement of lost circulation materials into the lost circulation zone. These conventional lost circulation materials may be placed into the formation, inter alia, as part of a drilling fluid or as a separate lost circulation pill in an attempt to control and/or prevent lost circulation. Conventional lost circulation materials may include graphitic carbon, ground battery casings, ground tires, ground nut shells (e.g., walnut shells, peanut shells, and almond shells), sized-calcium carbonate, petroleum coke, glass, mica, ceramics, polymeric beads, and the like. To increase the effectiveness of these conventional lost circulation materials, the particle sizes of the lost circulation materials have been optimized. For instance, petroleum coke having from about 35% to about 90% by weight particles between 10 mesh and 60 mesh has been used as a lost circulation material. Additionally, lost circulation materials have been added to drilling fluids in an attempt to increase the effective fracture gradient to allow for continued drilling and prevent lost circulation. For instance, the inclusion of lost circulation materials having between about 250 microns and about 600 microns in the drilling fluid may induce a screenout in the fracture tip that may reduce propagation or creation of fractures in the formation. These conventional methods for combating lost circulation, however, may not provide a desirable level of lost circulation control.

SUMMARY

The present invention relates to subterranean operations. More particularly, the present invention relates to lost circulation compositions and methods of using such lost circulation compositions.

In one embodiment, the present invention provides a lost circulation composition that comprises a first portion of particles having a weight mean particle size of less than about 20 microns; a second portion of particles having a weight mean particle size in the range of from about 25 microns to about 400 microns, and a third portion of particles having a weight mean particle size in the range of from about 450 microns to about 1,500 microns, wherein the lost circulation composition has a multimodal particle size distribution, wherein resilient particles, particles comprising a thermoset polymer laminate, or a combination thereof are present in the lost circulation composition in an amount of at least about 20% by weight of the lost circulation composition.

In another embodiment, the present invention provides a fluid that comprises a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination there are present in the lost circulation composition in an amount of at least about 20% by weight of the lost circulation composition.

In another embodiment, the present invention provides a method of controlling lost circulation that comprises contacting a lost circulation zone in a subterranean formation with a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of third particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition.

In another embodiment, the present invention provides a method of controlling lost circulation that comprises adding to a fluid a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition.

In another embodiment, the present invention provides a method of increasing an effective fracture gradient in a portion of a subterranean formation while drilling a well bore that penetrates the portion of the subterranean formation, the method comprising providing a fluid that comprises a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition; placing the fluid into the well bore; and allowing the fluid to contact the portion of the subterranean formation penetrated by the well bore.

In yet another embodiment, the present invention provides a method of controlling lost circulation that comprises providing a fluid that comprises a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition.; placing the fluid into a well bore; and allowing the fluid to contact a lost circulation zone penetrated by the well bore.

The features and advantages of the present invention will be readily apparent to those skilled in the art upon a reading of the description of the specific embodiments which follows.

BRIEF DESCRIPTION OF THE DRAWINGS

A more complete understanding of the present disclosure and advantages thereof may be acquired by referring to the following description taken in conjunction with the accompanying drawings, wherein.

While the present invention is susceptible to various modifications and alternative forms, specific embodiments thereof have been shown by way of example in the figures and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DESCRIPTION

The present invention relates to subterranean operations. More particularly, the present invention relates to lost circulation compositions and methods of using such lost circulation compositions.

The present invention provides lost circulation compositions with improved particle size distributions. In certain embodiments, the present invention provides a lost circulation composition that comprises a first portion of particles having a weight mean particle size ("d50") of less than about 20 microns; a second portion of particles having a d50 in the range of from about 25 microns to about 400 microns, and a third portion of particles having a d50 in the range of from about 450 microns to about 1,500 microns, wherein the lost circulation composition has a multimodal size distribution. As used herein, the term "particle(s)" refers to particles having a well-defined physical shape as well as those with irregular geometries, including any particles having the physical shape of platelets, shavings, fibers, flakes, ribbons, rods, strips, spheroids, toroids, pellets, tablets, or any other physical shape. The lost circulation compositions having a multimodal particles size distribution may have a bimodal particle size distribution, trimodal particle size distribution, or other suitable particle size distribution as desired by one of ordinary skill in the art based, inter alia, on the particular application.

Generally, resilient particles, particles comprising a thermoset polymer laminate, or a combination thereof are present in the loss circulation composition in an amount of at least about 20% by weight of the lost circulation composition. For example, resilient particles may be present in the lost circulation composition in an amount of at least about 20% by weight. Alternatively, particles comprising a thermoset polymer laminate may be present in the lost circulation composition in an amount of at least about 20% by weight. In yet other embodiments, resilient particles may be present in the lost circulation composition in an amount of at least about 10% by weight and particles comprising a thermoset polymer laminate may be present in the lost circulation composition in an amount of at least about 10% by weight. In some embodiments, at least a portion of the particles comprising the thermoset polymer laminate may be in the form of platelets.

The first portion of particles included in the lost circulation compositions should have a d50 of less than about 20 microns. Generally, the first portion of particles may comprise any materials suitable for use as lost circulation materials, including, but not limited to, minerals (e.g., mineral fibers such as basalt, wollastonite, and sepiolite), thermoset polymer laminates, graphitic carbon-based materials, ground battery casings, ground tires, ground nut shells (e.g., walnut shells, peanut shells, almond shells, etc.), sized-calcium carbonate, petroleum coke, vitrified shale, calcium clay, glass (e.g., ground glass, glass fibers, hollow glass beads, etc.), mica, ceramics, polymeric materials (e.g., hollow or solid polymeric beads, such as styrenedivinyl benzene crosslinked beads, vinylidene chloride beads, polystyrene beads, and the like), synthetic materials (e.g., fibers such as polypropylene fibers), and mixtures thereof. Of these, graphitic carbon-based materials and sized-calcium carbonate are preferred. An example of suitable sized-calcium carbonate having a d50 of less than about 20 microns is "BARACARB® 5" sized-calcium carbonate, which is commercially available from Halliburton Energy Services, Duncan, Okla. Generally, the graphitic carbon-based materials of the present invention may comprise graphite and a carbon matrix. In certain embodiments, the graphite may be present in the graphitic carbon-based materials in an amount of at least about 20% by weight and, in other embodiments, in an amount of from about 80% to about 95% by weight. An example of a suitable calcium clay having a d50 of less than about 20 microns are calcium montmorrillonite clay, commonly referred to as "Rev Dust," that is commercially available from Baroid Drilling Fluids, Houston, Tex. Other suitable clays and minerals include kaolinite, attapulgite, zeolite, silica, and combinations thereof. Furthermore, in addition to the above-listed materials, the first portion of particles may also comprise drill solids, such as weighting materials (e.g., barite) and bentonite, that are commonly included in drilling fluids, which also may serve as lost circulation materials for the purposes of the present invention when they fall within the specified size range. The appropriate type and amount of the first portion of particles to include in a lost circulation composition of the present invention will vary dependent upon a variety of factors known to those skilled in the art, including formation characteristics and conditions, such as circulation loss rates, fracture geometry, and the like.

In some embodiments, the first portion of particles may comprise resilient particles. As used herein, the phrase "resilient particles" refers to particles that rebound and do not fail when a compaction pressure is applied. Suitable resilient particles may comprise a variety of suitable materials, including graphitic carbon-based materials or elastomeric styrene butadiene block or random copolymers. Graphitic carbon-based materials generally are considered resilient if they have a resiliency of at least about 20% after compression at 10,000 psi. As used herein, the term "resiliency" refers to the percentage increase in sample volume after release of a compaction pressure and is defined by the following formula:

$$\% \text{Resiliency} = 100 \left( \frac{h_r}{h_o} - 1 \right)$$

wherein $h_o$ is the height of a column of the material being tested under the compaction pressure and $h_r$ is the height of the column of the material being tested after the compaction pressure is released. An exemplary resiliency test procedure is described in U.S. Pat. No. 5,826,669, the relevant disclosure of which is incorporated by reference herein. An example of suitable resilient carbon-based materials having a d50 of less than about 20 microns is "DESULCO® 9090 RGC" carbon additive having a d50 of about 15 microns, which is commercially available from Superior Graphite, Chicago, Ill. An example of suitable particles comprising elastomeric styrene butadiene block or random copolymers is "Finaprene® 411," which is commercially available from TOTAL Petrochemicals Elastomers USA, Inc., Houston, Tex. In some embodiments, resilient particles are present in the first portion of particles in an amount of at least about 30% by weight of the first portion. One of ordinary skill in the art will be able to determine additional resilient particles suitable for a particular application.

The second portion of particles included in the lost circulation compositions of the present invention should have a d50 in the range of from about 25 microns to about 400 microns. In some embodiments, the second portion of particles may have a d50 in the range of from about 75 microns to about 350 microns. Generally, the second portion of particles may comprise any materials suitable for use as lost circulation materials, including, but not limited to, minerals (e.g., mineral fibers such as basalt, wollastonite, and sepiolite), thermoset polymer laminates, graphitic carbon-based materials, ground battery casings, ground tires, ground nut shells (e.g., walnut shells, peanut shells, almond shells, etc.), sized-calcium carbonate, petroleum coke, vitrified shale, calcium clay, glass (e.g., ground glass, glass fibers, hollow glass beads, etc.), mica, ceramics, polymeric materials (e.g., hollow or solid polymeric beads, such as styrenedivinyl benzene crosslinked beads, vinylidene chloride beads, polystyrene beads, and the like), synthetic materials (e.g., fibers such as polypropylene fibers), and mixtures thereof. Of these, thermoset polymer laminates at least a portion of which are in the form of platelets, graphitic carbon-based materials, and sized-calcium carbonate are preferred. Examples of suitable sized-calcium carbonate having a d50 in the range of from about 25 microns to about 400 microns include "BARACARB® 25" sized-calcium carbonate, "BARACARB® 50" sized-calcium carbonate, and "BARACARB® 150" sized-calcium carbonate, which are commercially available from Halliburton Energy Services, Duncan, Okla. Generally, the graphitic carbon-based materials of the present invention may comprise graphite and a carbon matrix. In certain embodiments, the graphite may be present in the graphitic carbon-based materials in an amount of at least about 20% by weight and, in other embodiments, in an amount of from about 80% to about 95% by weight. Examples of suitable thermoset laminate materials include those that comprise melamine formaldehyde polymers, urea-formaldehyde type of thermoset polymers, and combinations thereof. One example of a commercially available thermoset polymer laminate material is "FORMICA®" brand laminate from Formica Corporation, Cincinnati, Ohio. An example of commercially available particles comprising thermoset polymer laminates is "PHENOSEAL™ ground laminate from Forta Corporation, Philadelphia, Pa. "PHENOSEAL™ ground laminate is available in Fine, Medium, and Coarse grades. Of these, the Fine Grade material about 55% of which passes through a 250 micron (60 mesh) screen is preferable. The appropriate type and amount of the second portion of particles to include in the lost circulation compositions of the present invention will vary dependent upon a variety of factors known to those skilled in the art, including formation characteristics and conditions, such as circulation loss rates, fracture geometry, and the like.

In some embodiments, the second portion of particles may comprise resilient particles. Suitable resilient particles may comprise a variety of suitable materials, including graphitic carbon-based materials or elastomeric styrene butadiene block or random copolymers. Graphitic carbon-based materials generally are considered resilient if they have a resiliency of at least about 20% after compression at 10,000 psi. Examples of suitable resilient carbon-based materials having a d50 in the range of from about 25 microns to about 400 microns include "STEELSEAL®" carbon additive and "STEELSEAL® Fine" carbon additive, which are commercially available from Halliburton Energy Services, Inc., Duncan, Okla. An example of suitable particles comprising elastomeric styrene butadiene block or random copolymers is "Finaprene® 411," which is commercially available from TOTAL Petrochemicals Elastomers USA, Inc., Houston, Tex. One of ordinary skill in the art will be able to determine additional resilient particles suitable for a particular application. In some embodiments, resilient particles, particles comprising a thermoset polymer laminate, or combinations thereof are present in the second portion of particles in an amount of at least about 30% by weight of the second portion.

The third portion of particles that may be included in the lost circulation compositions of the present invention should have a d50 in the range of from about 450 microns to about 1,500 microns. In some embodiments, the third portion of particles may have a d50 in the range of from about 450 microns to about 800 microns. Generally, the third portion of particles may comprise any materials suitable for use as lost circulation materials, including, but not limited to, minerals (e.g., mineral fibers such as basalt, wollastonite, and sepiolite), thermoset polymer laminates, graphitic carbon-based materials, ground battery casings, ground tires, ground nut shells (e.g., walnut shells, peanut shells, almond shells, etc.), sized-calcium carbonate, petroleum coke, vitrified shale, calcium clay, glass (e.g., ground glass, glass fibers, hollow glass beads, etc.), mica, ceramics, polymeric materials (e.g., hollow or solid polymeric beads, such as styrenedivinyl benzene crosslinked beads, vinylidene chloride beads, polystyrene beads, and the like), synthetic materials (e.g., fibers such as polypropylene fibers), and mixtures thereof. Of these, thermoset polymer laminates at least a portion of which are in the form of platelets, graphitic carbon-based materials, and sized-calcium carbonate are preferred. An example of suitable sized-calcium carbonate having a d50 in the range of from about 450 microns to about 1,500 microns is "BARACARB® 600" sized-calcium carbonate, which is commercially available from Halliburton Energy Services, Duncan, Okla. Generally, the graphitic carbon-based materials of the present invention may comprise graphite and a carbon matrix. In certain embodiments, the graphite may be present in the graphitic carbon-based materials in an amount of at least about 20% by weight and, in other embodiments, in an amount of from about 80% to about 95% by weight. Examples of suitable thermoset laminates include those that comprise melamine formaldehyde polymers, urea-formaldehyde type of thermoset polymers, and combinations thereof. One example of a commercially available thermoset polymer laminate material is "FORMICA®" brand laminate from Formica Corporation, Cincinnati, Ohio. An example of commercially available particles comprising thermoset polymer laminates is "PHENOSEAL™ ground laminate from Forta Corporation, Philadelphia, Pa. "PHENOSEAL™ ground laminate is available in Fine, Medium, and Coarse grades. Of these, the Fine Grade material about 79% of which passes through a 850 micron (20 mesh) screen is preferable. For wider fracture widths, the Medium Grade material or the Coarse Grade material may be preferable. About 75% of the PHENOSEAL™ Medium Grade ground laminate particles pass through a 1190 micron (14 mesh) screen but not through a 850 micron (20 mesh) screen. About 70% of the PHENOSEAL™ Coarse Grade ground laminate particles pass through a mesh screen between 1190 microns (14 mesh) and 2000 microns (10 mesh). The appropriate type and amount of the third portion of particles to include in the lost circulation compositions of the present invention will vary dependent upon a variety of factors known to those skilled in the art, including formation characteristics and conditions, such as circulation loss rates, fracture geometry, and the like.

In some embodiments, the third portion of particles may comprise resilient particles. Suitable resilient particles may comprise a variety of suitable materials, including graphitic carbon-based materials or elastomeric styrene butadiene block or random copolymers. Graphitic carbon-based materials generally are considered resilient if they have a resiliency of at least about 20% after compression at 10,000 psi. An example of suitable particles comprising elastomeric styrene butadiene block or random copolymers is "Finaprene® 411," which is commercially available from TOTAL Petrochemicals Elastomers USA, Inc., Houston, Tex. One of ordinary skill in the art will be able to determine additional resilient particles suitable for a particular application. In some embodiments, resilient particles, particles comprising a thermoset polymer laminate, or combinations thereof are present in the third portion of particles in an amount of at least about 30% by weight of the third portion.

The lost circulation compositions of the present invention may provide, among other things, improved lost circulation control over conventional lost circulation compositions. For example, the lost circulation compositions of the present invention may effectively seal the pores and fractures that may be present in shales, sandstones, carbonate rock, and the like. It is believed that due, inter alia, to fluid leak off into the formation the particles present in the lost circulation compositions of the present invention may concentrate in areas leading up to the tip of fractures in the formation, wherein these fractures may be preexisting fractures in the formation or fractures induced by the pressure of fluid (e.g., a drilling fluid). As the concentration of these particles within the fractures and at the fracture tip increases, the transmission of fluid pressure from the fluid to the fracture tip may be reduced, thereby causing a "tip screenout" and a resulting reduction in the effective fracture gradient and prevention of fracture propagation. By including resilient particles in the lost circulation composition, the functionality of the lost circulation composition may be improved. For example, their resiliency may allow the resilient particles to absorb the imposed pressure by reduction in volume and/or to mold themselves into the fracture tip when pressure is applied, thereby rebounding to plug the fracture when the pressure is released. Presence of platelets (e.g., particles comprising a thermoset polymer laminate) of suitable sizes in relation to the fracture width is believe to provide a strong bridging mesh type scaffold network between the walls of the fracture. Generally, resilient particles, particles comprising a thermoset polymer laminate, or a combination thereof may be present in the lost circulation compositions of the present invention in an amount of at least about 20% by weight of the lost circulation composition. Furthermore, the first portion of particles of the present invention may act to improve the functionality of the lost circulation compositions of the present invention. Among other things, it is believed that the first portion of particles may plug the interstices between the second and/or third portion of particles when the lost circulation compositions of the present invention are concentrated within fractures in the subterranean formation, and it is believed that the second portion of particles may plug interstices between the third portion of particles when the lost circulation compositions of the present invention are concentrated within fractures in the subterranean formation.

The lost circulation compositions of the present invention may be included in a variety of fluids in order to prevent or control lost circulation. For example, the lost circulation compositions of the present invention may be included in fluids which are circulated in a well bore, including drilling fluids, spacer fluids, completion fluids (e.g., completion brines), and workover fluids. Generally, the drillings fluids may comprise any suitable fluids, including water-based fluids, oil-based fluids, or combinations thereof. Furthermore, the lost circulation compositions of the present invention may be included in lost circulation treatment fluids that may be used in remedial treatments to control lost circulation. Generally, the lost circulation treatment fluids may comprise any suitable fluids, including water-based fluids, oil-based fluids, or combinations thereof. In some embodiments, the lost circulation treatment fluids may be foamed. One of ordinary skill in the art, with the benefit of this disclosure, will recognize that spacer fluids may need to be used to separate a lost circulation treatment fluids from other fluids in the well bore, for example, where the lost circulation treatment fluid is not compatible with the other fluids in the well bore.

The amount of the lost circulation composition to include in these fluids depends, inter alia, on formation characteristics and conditions, the downhole equipment, the desired application, and other factors known to those skilled in the art. In some embodiments, a lost circulation composition of the present invention may be included in a fluid in an amount of less than about 100 pounds of the lost circulation composition per barrel of the fluid. In certain embodiments, for example, where the lost circulation composition is included in a drilling fluid, a lost circulation composition of the present invention may be included in a drilling fluid in an amount in the range of from about 10 pounds to about 30 pounds of the lost circulation composition per barrel of the drilling fluid. In certain embodiments, for example, where the lost circulation composition is included in a lost circulation treatment fluid, a lost circulation composition of the present invention may be included in a lost circulation treatment fluid in an amount in the range of from about 30 pounds to about 80 pounds of the lost circulation composition per barrel of the fluid. One of ordinary skill in the art, with the benefit of this application, will know the appropriate amount of a lost circulation composition of the present invention to include in a fluid for a particular application.

The lost circulation compositions of the present invention may be prepared in a variety of ways. For example, the components of the lost circulation compositions may be dry blended and then mixed into the fluid at the point of usage. In other embodiments, the components of the lost circulation composition may be simultaneously added to the fluid. In yet other embodiments, the components of the lost circulation composition may be individually added to the fluid. For example, where added to a drilling fluid, the drilling fluid already may comprise at least a portion of the particles (e.g., drill solids) that form the lost circulation compositions of the present invention. Therefore, only the particles not present in the drilling fluid may be added to such drilling fluid to form the lost circulation compositions of the present invention.

In one embodiment, the present invention provides a lost circulation composition that comprises a first portion of particles having a weight mean particle size of less than about 20 microns; a second portion of particles having a weight mean particle size in the range of from about 25 microns to about 400 microns, and a third portion of particles having a weight mean particle size in the range of from about 450 microns to about 1,500 microns, wherein the lost circulation composition has a multimodal particle size distribution, wherein resilient particles, particles comprising a thermoset polymer laminate, or a combination thereof are present in the lost circulation composition in an amount of at least about 20% by weight of the lost circulation composition.

In another embodiment, the present invention provides a drilling fluid that comprises a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination there are present in the lost circulation composition in an amount of at least about 20% by weight of the lost circulation composition.

In another embodiment, the present invention provides a method of controlling lost circulation that comprises contacting a lost circulation zone in a subterranean formation with a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of third particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition.

In another embodiment, the present invention provides a method of controlling lost circulation that comprises adding to a fluid a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition.

In another embodiment, the present invention provides a method of increasing an effective fracture gradient in a portion of a subterranean formation while drilling a well bore that penetrates the portion of the subterranean formation, the method comprising providing a fluid that comprises a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition; placing the fluid into the well bore; and allowing the fluid to contact the portion of the subterranean formation penetrated by the well bore.

In yet another embodiment, the present invention provides a method of controlling lost circulation that comprises providing a fluid that comprises a lost circulation composition having a multimodal particle size distribution, the lost circulation composition comprising a first portion of particles having a weight mean particle size of less than about 20 microns, a second portion of particles having a weight mean particle size in the range of from about 25 microns to about 400 microns, and a third portion of particles having a weight mean particle size in the range of from about 450 microns to about 1,500 microns, wherein resilient particles, particles comprising a thermoset polymer laminate, or a combination thereof are present in the lost circulation composition in an amount of at least about 20% by weight of the lost circulation composition.; placing the fluid into a well bore; and allowing the fluid to contact a lost circulation zone penetrated by the well bore.

To facilitate a better understanding of the present invention, the following examples of specific embodiments are given. In no way should the following examples be read to limit, or define, the scope of the invention.

EXAMPLE 1

Particles sizes for various materials that may be used to prepare lost circulation compositions of the present invention were measured using Malvern equipment. In particular, particles sizes for BARACARB® 150 sized-calcium carbonate, BARACARB® 600 sized-calcium carbonate, STEELSEAL® carbon additive, Mica, and Rev Dust were measured and are presented in Table 1.

TABLE 1

| Particle Type | Mean size (microns) | Size of particles under 10% by volume (microns) | Size of particles under 90% by volume (microns) | Span[1] |
|---|---|---|---|---|
| STEELSEAL ® | 300 | 145 | 573 | 1.43 |
| BARACARB ™ 150 | 200 | 64 | 404 | 1.69 |
| BARACARB ™ 600 | 670 | 411 | 835 | 6.3 |
| Mica | 270 | 60 | 570 | 1.9 |
| Rev Dust | 20 | 2.6 | 63.8 | 3.06 |

[1]Span is a measure of particle size distribution

Particle sizes for the "PHENOSEAL™ ground laminate were beyond the measuring ability of the Malvern Particle Size Analyzer. The manufacturer provided data is summarized as follows. The material is available in Fine, Medium, and Coarse grades. About 79% of the Fine Grade material passes through a 850 micron (20 mesh) screen. About 75% of the Medium Grade material passes through a 1190 micron (14 mesh) screen but not through a 850 micron (20 mesh) screen. And about 70% of the Course Grade material passes through a mesh screen between 1190 microns (14 mesh) and 2000 microns (10 mesh).

EXAMPLE 2

Tests were conducted using various sample lost circulation treatment fluids and a Hassler sleeve test cell containing a synthetic core. Synthetic cores, having a length of 4.2 inches and a diameter of 1 inch, were prepared by mixing different grades of sand (5% 12/20 mesh sand; 25% 20/40 mesh sand; 70% Oklahoma No. 1 sand) with mixed with a resin mixture. The resin mixture for a single synthetic core comprised a bisphenol-A epoxide resin (ER-1™, 4 ml), a gamma-aminopropyl tri-alkoxy silane coupling agent (PLASTIC FIXER, 0.3 ml), and a diamine hardener (EH-2™, 4 ml). The mixture was charged into a TEFLON™ tube containing, in the center of the tube, a TEFLON™ rectangular stick or a stainless steel stick which had been machined to have the desired tapering width along the length of the stick. The height of the stick was 12 mm. When the sand mix was partially cured, the stick was pulled out and the mix was allowed to set in the tube at 140° F. for at least 6 hrs. Therefore, the synthetic core was formed with a simulated fracture therein where the width of the simulated fracture was based on the tapering of the stick. Thus, synthetic cores were formed having a wider end of about 3 mm and a narrower end ranging from about 1 mm to about 3 mm, depending on the tapering of the stick.

Figure 1:
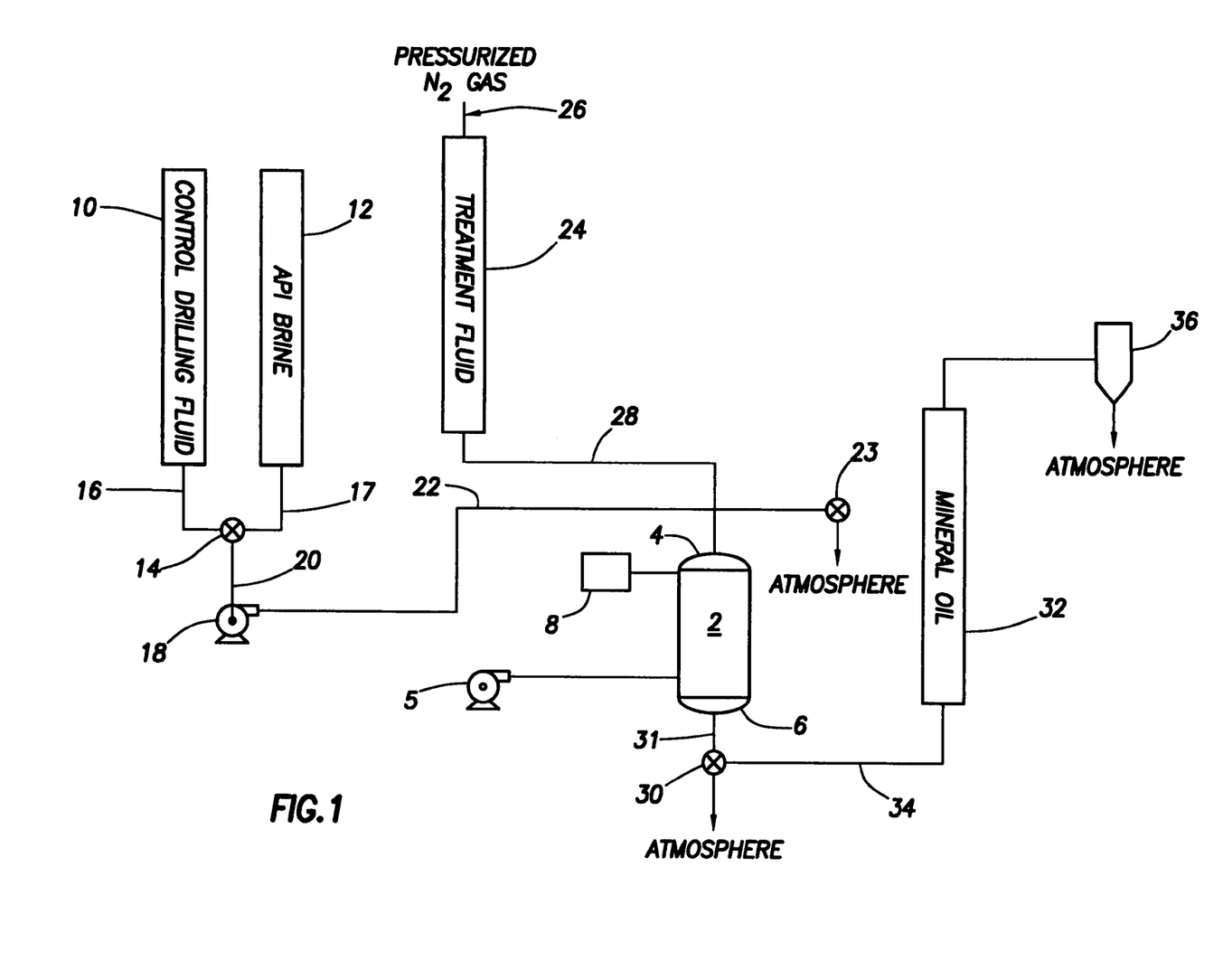
FIG. 1 is a schematic illustration of a test apparatus used in Example 2 and Example 3.

Referring now to FIG. 1, the test equipment used in this example is illustrated. A synthetic core, prepared as described above, was fitted into a rubber sleeve (not shown), inserted a metal receptacle (not shown), and mounted in a Hassler sleeve test cell 2, having one end thereof designated as the well bore side 4 and one end thereof designated as the formation side 6. The synthetic core was mounted so that the wider end of the simulated fracture faced well bore side 4. The pressure on well bore side 4 of test cell 2 was measured by a pressure transducer 8 mounted on well bore side 4 of test cell 2. The metal cylinder containing the core inside the rubber sleeve was connected to a pump 5 with which a desired pressure can be applied on the rubber sleeve to achieve an impermeable fit between the core and the rubber sleeve. The test cell 2 also was connected to a thermostat (not shown) to the control the temperature during testing.

A drilling fluid reservoir 10 and a brine reservoir 12 were provided and the bottoms of these two reservoirs were connected to a three-way valve 14 by conduits 16 and 17, respectively. Drilling fluid reservoir 10 contains a control drilling fluid, and brine reservoir 12 contains an API brine. The outlet of three-way valve 14 was connected to the inlet of a pump 18 by conduit 20. Pump 18 had a programmable flow rate and pressure. The outlet of pump 18 was connected to the entrance of well bore side 4 of test cell 2 by a conduit 22. Thus, by appropriate manipulation of three-way valve 14, pump 18 was used to direct either the control drilling fluid or the API brine to test cell 2. Also, conduit 22 was connected to valve 23 which was connected to atmosphere.

A sample reservoir 24 was also provided, and the top of sample reservoir 24 was connected to a source of pressurized nitrogen, generally designated by numeral 26. Sample reservoir 24 contained a sample lost circulation treatment fluid. The bottom outlet of sample reservoir 24 was optionally connected to the top to the entrance of well bore side 4 of test cell 2 by a conduit 28. Test cell 2 had a three-way design to connect sample reservoir 24 to test cell 2 by conduit 28 without having to disconnect conduit 22.

The exit of formation side 6 of test cell 2 was connected to a three-way valve 30 by conduit 31. One outlet connection of three-way valve 30 was connected to atmosphere. The other outlet connection of three-way valve 30 was connected to the bottom of an oil reservoir 32 that contained a mineral oil by conduit 34. The top of oil reservoir 32 was connected to a back pressure regulator 36, the pressure of which was adjusted with nitrogen pressure. The other side of back pressure regulator 36 was connected to atmosphere.

The test procedure was designed to determine the ability of a lost circulation composition to withhold pressure applied from a drilling fluid when applied on the wider end of the simulated fracture, as described in the Forward Flow Procedure listed below. Additionally, if the lost circulation composition withstood the pressure during the forward flow procedure, the ability of the lost circulation composition to withstand pressure applied from formation fluids was determined, as described in the Reverse Flow Procedure listed below.

Forward Flow Test Procedure

First, pump 18 was used to pass the control drilling fluid from drilling fluid reservoir 10 through the synthetic core within test sleeve 2, from well bore side 4 to formation side 6. Three-way valve 30 was open to atmosphere. Once synthetic core was wet with the control drilling fluid, the pump was stopped and the three-way design into test cell 2 at well bore side 4 was altered to allow for drilling fluid flow from conduit 28 through which sample reservoir was connected to test cell 2. The three-way design restricted flow back into conduit 22. The sample lost circulation treatment fluid was then prepared by adding the components thereof into a separate beaker (directly into sample reservoir 24 if it the fluid viscosities too quickly) and stirring for about one minute with a spatula. Upon preparation, the sample lost circulation treatment fluid was charged into sample reservoir 24. Next, pressure from source of pressurized nitrogen 26 was used to push the lost circulation treatment fluid through the synthetic core within test sleeve 2, from well bore side 4 to formation side 6. The lost circulation treatment fluid was pushed through the synthetic core until it extruded though the formation side 6 of test cell 2. Hopefully, the lost circulation composition within the sample lost circulation treatment fluid plugged the simulated fracture of the synthetic core, which was indicated by stoppage of fluid drainage with minimum applied pressure of about 500 psi. Subsequently, test cell 2 should be disconnected from conduit 28 and conduit 31, and any solid on the face or bottom of the synthetic core or any conduits was cleaned. Once cleaned, test cell 2 was reconnected conduit 31 and conduit 22 so that the outlet of pump 18 was connected to test cell 2.

Next, pump 18 was used to pump the control drilling fluid from drilling fluid reservoir 10 to fill conduit 22 with the control drilling fluid. Also, conduit 31 and conduit 34 were filled with mineral oil from oil reservoir 32 by controlling three-way valve 30, after which three-way valve 30 was closed to atmosphere. Next, the drilling fluid in drilling fluid reservoir 10 and test cell 2 were heated to 180° F. After 30 minutes at 180° F., pump 18 was set at a flow rate of 2 milliliters per minute (ml/min) and a pressure of 100 psi. In addition, a back pressure of 100 psi was applied to back pressure regulator 36 with nitrogen gas. Additionally, pump 5 was used to apply a pressure on the rubber sleeve of 300 psi to about 600 psi higher than the pressure applied by pump on well bore side 4. The pressure at the face of the synthetic core on well bore side 4 of test cell 2 was measured using pressure transducer 8. If the lost circulation composition withstood the initial pressure, the pressure applied to well bore side 4 (using pump 18) and the pressure applied to the rubber sleeve (using pump 5) were steadily increased in 100 psi increments up to the maximum operating pressure of test cell 2 while observing the flow rate of oil dripping through back pressure regulator 36. If the flow rate of oil dripping through back pressure regulator 36 reaches 2 ml/min or the pressure read by pressure transducer 8 dropped to zero, the plug of the lost circulation composition in the simulated fracture of the synthetic core failed to withstand the pressure applied thereto by the control drilling fluid. When the pressure of pump 18 reached the maximum operating pressure of test cell 2, the pressure was held for 30 minutes and the flow of oil through back pressure regulator 36 was observed.

Reverse Flow Test Procedure

Figure 2:
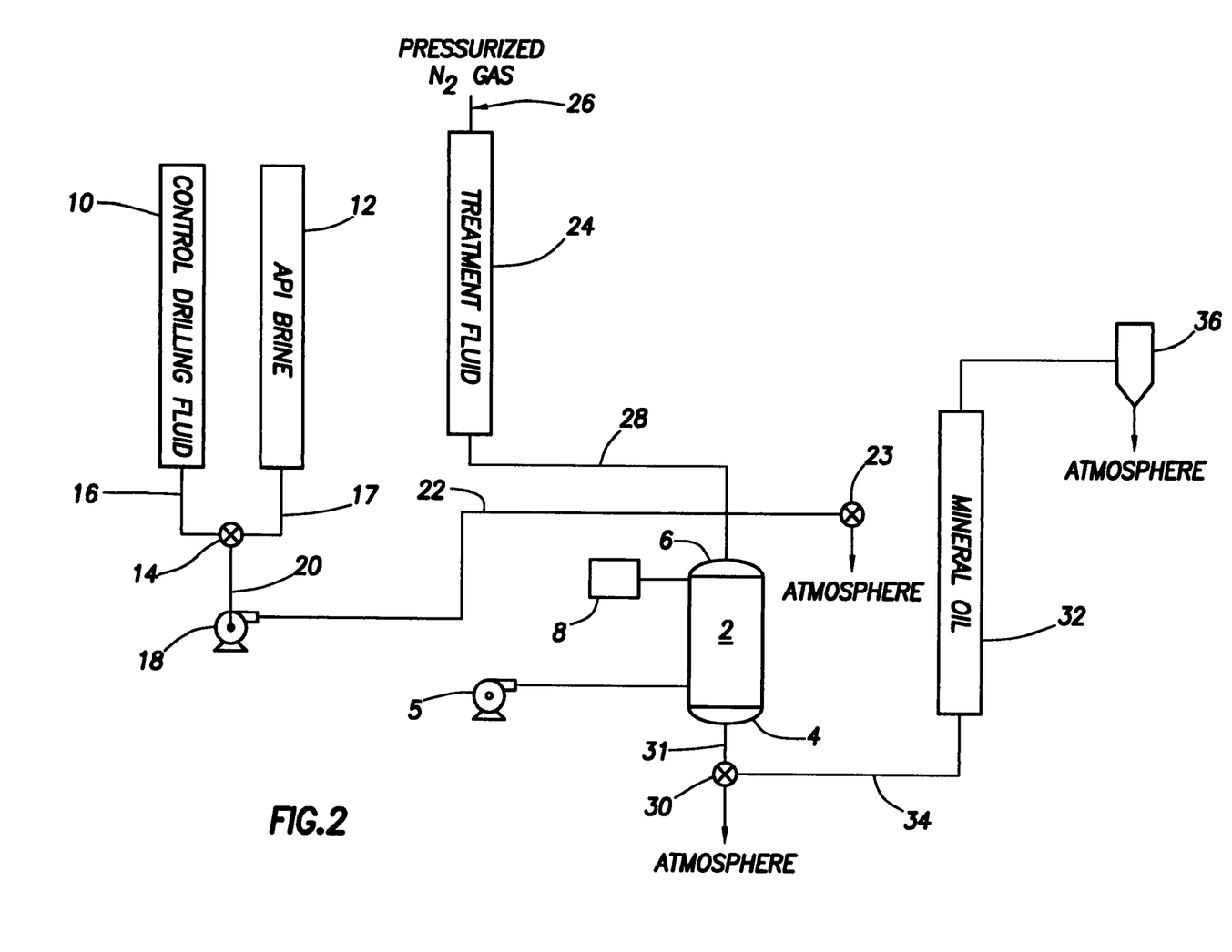
FIG. 2 is a schematic illustration of a test apparatus used in Example 2 and Example 3.

First, while maintaining temperature at 180° F., test cell 2 was reversed within the system, as shown in FIG. 2. Accordingly, pump 18 was connected to the formation side 6 of test cell 2 by conduit 22. Likewise, well bore side 4 was connected to three-way valve 30 by conduit 31. Also, pressure transducer 8 was positioned to measure the pressure on formation side 6 of test cell 2.

Next, pump 18 was used to flush any of the control drilling fluid in conduit 22 through valve 23 to atmosphere. Next, pump 18 was set to provide the API brine to the formation side 6 of test cell 2 at flow rate of 2 ml/min and a pressure of 100 psi. In some tests, pump 18 provided the control drilling fluid. Because test cell 2 was reversed, the pressure from the API brine was applied to the narrow end of the simulated fracture in the synthetic core. In addition 100 psi was applied to back pressure regulator 36 with nitrogen gas. Additionally, pump 5 was used to apply a pressure on the rubber sleeve of 300 psi to 600 psi higher than that applied by pump 18 on formation side 6. The pressure at the face of the synthetic core on formation side 6 of test cell 2 was measured using pressure transducer 8. If the lost circulation composition withstood the initial pressure, the pressure applied to it by the API brine (using pump 18) and the pressure applied to the rubber sleeve (using pump 5) were steadily increased in 100 psi increments up to the maximum operating pressure test cell 2 while observing the flow rate of oil dripping through back pressure regulator 36. If the flow rate of oil dripping through back pressure regulator 36 reaches 2 ml/min or the pressure read by pressure transducer 8 drops to zero, the plug of the lost circulation composition in the simulated fracture of the synthetic core failed to withstand the pressure applied thereto by the control drilling fluid. When the pressure of pump 18 reached the maximum operating pressure of test cell 2 or the lost circulation composition failed, the heat was turned off and pump 18 and back pressure regulator 36 were stopped.

Sample Lost Circulation Treatment Fluids

Figure 3:
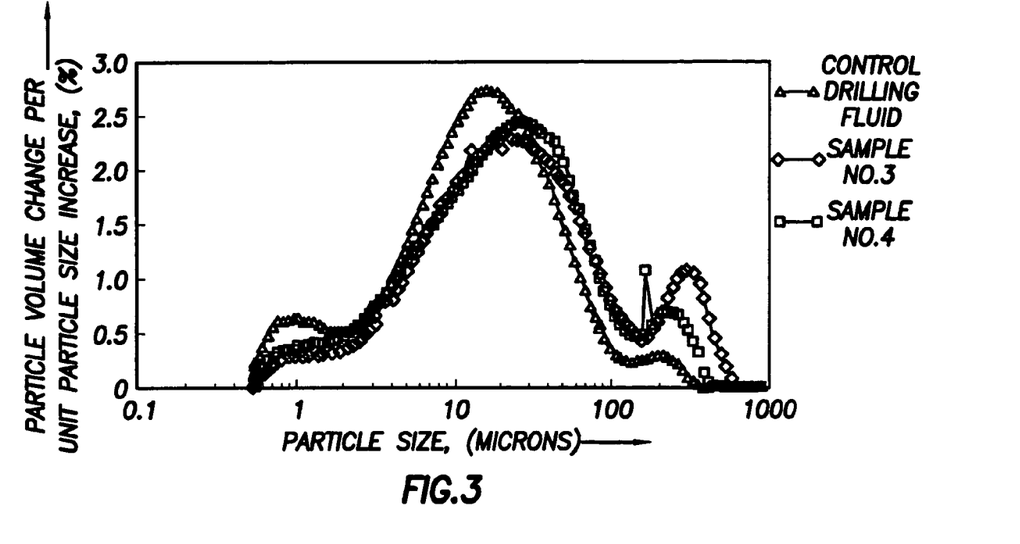
FIG. 3 and FIG. 4 are examples of graphical depictions of percent volume change per unit particle size increase versus particle size of various fluids used in the Examples.

These series of tests were conducted using a control drilling fluid and various sample lost circulation treatment fluids. The components of the fluids were mixed and either hot rolled or, when large quantities were made, kept in a water bath overnight at 150° F. for about 16 hours to about 18 hrs. When BARACARB® 150, BARACARB® 600, STEELSEAL®, and Rev Dust, were added to the sample lost circulation treatment fluid, these components were stirred into the fluid just prior to use, unless otherwise stated. Generally, these lost circulation compositions have different amounts, sizes, and types of particles therein, as lost circulation compositions. Referring now to FIG. 3, a graphical illustration of the percent volume change per unit particle size increase versus particle size is shown for the control drilling fluid, Sample Lost Circulation Treatment Fluid No. 3, and Lost Circulation Treatment Fluid No. 4. The formulations of the control drilling mud and Sample Lost Circulation Treatment Fluids Nos. 1-5 are provided in Table 2.

TABLE 2

| Component | Control Drilling Fluid | Sample Lost Circulation Treatment Fluid | | | | |
|---|---|---|---|---|---|---|
| | | No. 1 | No. 2 | No. 3 | No. 4 | No. 5 |
| Water (ppb) | 278 | 278 | 278 | 271 | 278 | 278 |
| Bentonite (ppb) | 4 | 4 | 4 | 4 | 4 | 4 |
| NaCl (ppb) | 72 | 72 | 72 | 63 | 72 | 72 |
| BARITE¹ (ppb) | 93 | 93 | 93 | 81 | 93 | 93 |
| XAN VIS² (ppb) | 1.3 | 1.3 | 1.3 | 1.3 | 1.3 | 1.3 |
| PAC L ™³ (ppb) | 0.25 | 0.25 | 0.25 | 0.25 | 0.25 | 0.25 |
| NaOH (ppb) | 0.5 | 0.5 | 0.5 | 0.5 | 0.5 | 0.5 |
| DEXTRID LT ™⁴ (ppb) | 1.0 | 1.0 | 1.0 | 1.0 | 1.0 | 1.0 |
| BARACARB ™ 600 (ppb) | None | 30 | 15 | 15 | None | None |
| BARACARB ™ 150 (ppb) | None | None | None | None | 30 | 100 |
| STEELSEAL ™ (ppb) | None | None | 15 | 15 | None | None |

TABLE 2-continued

|                | Control | Sample Lost Circulation Treatment Fluid | | | | |
|---|---|---|---|---|---|---|
| Component | Drilling Fluid | No. 1 | No. 2 | No. 3 | No. 4 | No. 5 |
| Mica (ppb) | None | None | None | None | None | None |
| Rev Dust (ppb) | None | None | None | 79 | None | None |
| Density, ppg | 11.4 | 11.7 | 11.7 | 12.2 | 11.8 | 12.5 |

[1]Barite is a barium sulfate that is commercially available from Baroid Drilling Fluids, Houston, TX.
[2]XAN VIS is a xanthan based viscosifying that is commercially polymer available from Baroid Drilling Fluids, Houston, TX.
[3]"PAC L ™" filtration control agents is a polyanionic cellulose that is commercially available from Baroid Drilling Fluids, Houston, TX.
[4]"DEXTRID LT ™" filtration control agent is a modified starch product that is commercially available from Baroid Drilling Fluids, Houston, TX.

The formulations of Sample Lost Circulation Treatment Fluids Nos. 6-10 are provided in Table 3.

TABLE 3

| | Sample Lost Circulation Treatment Fluid | | | | |
|---|---|---|---|---|---|
| Component | No. 6 | No. 7 | No. 8 | No. 9 | No. 10 |
| Water (ppb) | 278 | 278 | 278 | 278 | 278 |
| Bentonite (ppb) | 4 | 4 | 4 | 4 | 4 |
| NaCl (ppb) | 72 | 72 | 72 | 72 | 72 |
| BARITE[1] (ppb) | 93 | 93 | 93 | 93 | 93 |
| XAN VIS[2] (ppb) | 1.3 | 1.3 | 1.3 | 1.3 | 1.3 |
| PAC L ™[3] (ppb) | 0.25 | 0.25 | 0.25 | 0.25 | 0.25 |
| NaOH (ppb) | 0.5 | 0.5 | 0.5 | 0.5 | 0.5 |
| DEXTRID LT ™[4] (ppb) | 1.0 | 1.0 | 1.0 | 1.0 | 1.0 |
| BARACARB ™ 600 (ppb) | None | None | 7.5 | None | 22.5 |
| BARACARB ™ 150 (ppb) | 15 | 100 | 7.5 | None | None |
| STEELSEAL ™ (ppb) | 15 | 15 | 15 | 15 | 7.5 |
| Mica (ppb) | None | None | None | 15 | None |
| Rev Dust (ppb) | None | None | None | None | None |
| Density, ppg | 11.7 | 12.6 | 11.9 | 11.8 | 11.8 |

[1]Barite is a barium sulfate that is commercially available from Baroid Drilling Fluids, Houston, TX.
[2]XAN VIS is a xanthan based viscosifying that is commercially polymer available from Baroid Drilling Fluids, Houston, TX.
[3]"PAC L ™" filtration control agents is a polyanionic cellulose that is commercially available from Baroid Drilling Fluids, Houston, TX.
[4]"DEXTRID LT ™" filtration control agent is a modified starch product that is commercially available from Baroid Drilling Fluids, Houston, TX.

The results of the tests using the above-described sample lost circulation treatment fluids are provided in Table 4.

TABLE 4

| | | Forward Flow Test Results | | Reverse Flow Test Results | |
|---|---|---|---|---|---|
| Sample Lost Circulation Treatment Fluid | Simulated Fracture Width, mm → mm | Applied Pump Pressure (psi) | Maximum Pressure Measured at the Core Face (psi) | Fluid | Maximum Pressure Measured at the Core Face (psi) |
| No. 1[1] | 3 → 1 | 2000 | No failure up to 1900 psi | Control | Failure at 500 psi. |
| No. 2[1] | 3 → 1 | 2200 | No failure up to 2040 psi | Control | Failure at 1600 psi. |
| No. 2 | 3 → 1 | 2000 | No failure up to 1910 psi. | API Brine | No failure up to 1910 psi. |
| No. 2[1] | 3 → 1 | 2000 | No failure up to 1910 psi. | API Brine | No failure up to 1910 psi. |
| No. 2[2] | 3 → 1.8 | N/A | N/A | N/A | N/A |
| No. 2 | 3 → 3 | 0 | Failure at 0 psi. | N/A | N/A |
| No. 3 | 3 → 1.8 | 2000 | No failure up to 1860 psi.[3] | API Brine | No failure up to 1960 psi.[4] |
| No. 4 | 3 → 1 | 0 | Failure at 0 psi. | N/A | N/A |
| No. 5 | 3 → 1 | 0 | Failure at 0 psi. | N/A | N/A |
| No. 6 | 3 → 1 | 0 | Failure at 0 psi. | N/A | N/A |
| No. 7 | 3 → 1 | 0 | Failure at 0 psi. | N/A | N/A |
| No. 8 | 3 → 1.8 | 0 | Failure at 0 psi. | N/A | N/A |
| No. 8 | 3 → 1 | 0 | Failure at 0 psi. | N/A | N/A |

TABLE 4-continued

| Sample Lost Circulation Treatment Fluid | Simulated Fracture Width, mm → mm | Forward Flow Test Results | | Reverse Flow Test Results | |
|---|---|---|---|---|---|
| | | Applied Pump Pressure (psi) | Maximum Pressure Measured at the Core Face (psi) | Fluid | Maximum Pressure Measured at the Core Face (psi) |
| No. 9 | 3 → 1 | 0 | Failure at 0 psi. | N/A | N/A |
| No. 10 | 3 → 3 | 0 | Failure at 0 psi. | N/A | N/A |

[1]Lost Circulation Treatment Fluid sheared in a Waring blender for 15 sec @12000 rpm.
[2]Plug not formed in simulated fracture.
[3]Plug began to leak at 3000 psi and 8.3 ml of oil was collected between 300 psi and 2000 psi of pump pressure.
[4]Plug began to leak at 1450 psi and 1.3 ml of oil was collected between 1450 psi and 2000 psi of pump pressure.

Thus, Example 2 illustrates that varying the particle size distribution within a lost circulation treatment fluid may impact the ability of the lost circulation treatment fluid to prevent circulation losses.

EXAMPLE 3

Figure 4:
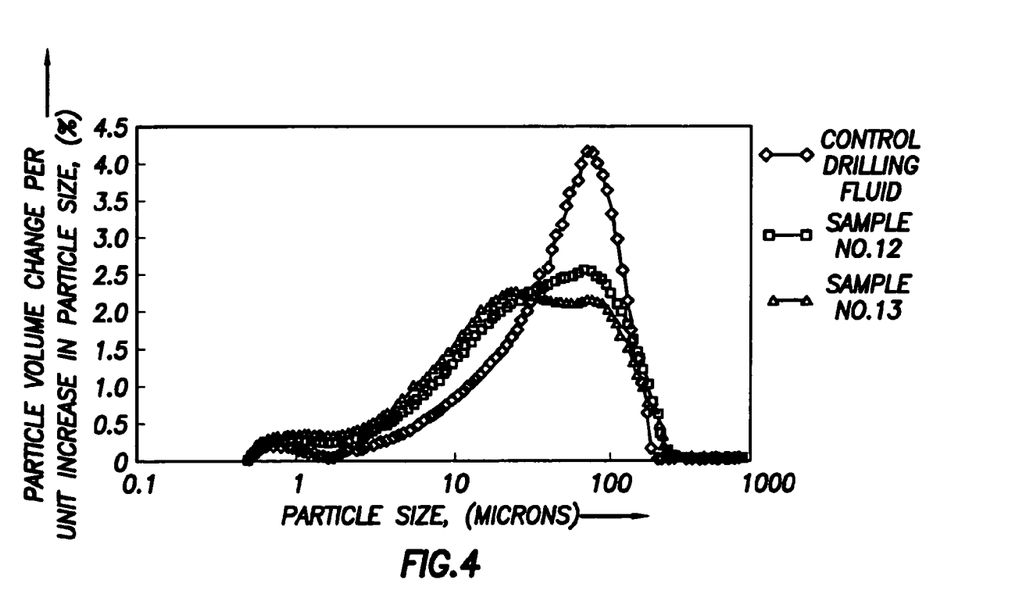

Additional tests were performed on a variety of sample lost circulation treatment fluids using the same procedures as in Example 2. For this series of tests, the control drilling fluid was a synthetic oil-based drilling fluid that is commercially available under the trademark "PETROFREE®" fluid from Baroid Drilling Fluids, Houston, Tex. Additionally, an oil wetting lecithin-based agent was added to the control drilling fluid in an amount of 2 pounds per barrel of the drilling fluid, the oil wetting lecithin-based agent is commercially available under the trademark "DRILTREAT®" additive from Baroid Drilling Fluids, Houston, Tex. An additional additive, that is commercially available under the trademark "EZ MUL® NT" emulsifier from Baroid Drilling Fluids, Houston, Tex., was also added to the control drilling fluid in an amount of 6 pounds per barrel of the drilling fluid to improve the oil wetting ability of the control drilling fluid. To prepare the sample lost circulation treatment fluids used in the present example, the control drilling fluid, prepared as described above, was mixed with particles of the type and amount shown in Table 5. Referring now to FIG. 4, a graphical illustration of the percent volume change per unit particle size increase versus particle size is shown for the control drilling mud, Sample Lost Circulation Treatment Fluid No. 12, and Sample Lost Circulation Treatment Fluid No. 13.

TABLE 5

| Component | Control Drilling Fluid | Sample Lost Circulation Treatment Fluid | | |
|---|---|---|---|---|
| | | No. 11 | No. 12 | No. 13 |
| BARACARB ™ 150 (ppb) | None | None | None | 15 |
| BARACARB ™ 600 (ppb) | None | 15 | 15 | 15 |
| STEELSEAL ™ (ppb) | None | 15 | 15 | 15 |
| Rev Dust (ppb) | None | None | 15 | 15 |

The results of the tests utilizing the above-described sample lost circulation treatment fluids are provided in Table 6.

TABLE 6

| Sample Lost Circulation Treatment Fluid | Simulated Fracture Width, mm → mm | Forward Flow Test Results | | Reverse Flow Test Results | |
|---|---|---|---|---|---|
| | | Applied Pump Pressure (psi) | Maximum Pressure Measured at the Core Face (psi) | Fluid | Maximum Pressure Measured at the Core Face (psi) |
| No. 11 | 3 → 1 | 0 | Failure at 0 psi pump pressure. | N/A | N/A |
| No. 12 | 3 → 1 | 2500 | No failure up to 1800 psi[1] | API Brine | Failure at 200 psi |
| No. 13 | 3 → 1 | 2500 | Failure at 1480 psi[2] | N/A | N/A |
| No. 13 | 3 → 1.8 | 0 | Failure at 0 psi | N/A | N/A |

[1]Average taken across four tests.
[2]Average taken across three tests.

Thus, Example 3 illustrates that varying the particle size distribution within a lost circulation treatment fluid may impact the ability of the lost circulation treatment fluid to prevent circulation losses.

EXAMPLE 4

Additional tests were performed on a variety of sample lost circulation treatment fluids utilizing the same procedures as in Example 2. For this series of tests, the control drilling fluid was a synthetic oil-based drilling fluid of 12 ppg that is commercially available under the trademark "PETROFREE®" fluid from Baroid Drilling Fluids, Houston, Tex. To prepare the sample lost circulation treatment fluids used in the present example, the control drilling fluid, prepared as described above, was mixed with particles of the type and amount shown in Table 7.

TABLE 7

| Component | Control Drilling Fluid | Sample Lost Circulation Treatment Fluid | | |
|---|---|---|---|---|
| | | No. 13[1] | No. 14[2] | No. 15 |
| BARACARB ™ 150 (ppb) | None | 15 | None | None |
| BARACARB ™ 600 (ppb) | None | 15 | 75 | None |
| STEELSEAL ™ (ppb) | None | 15 | 75 | 30 |
| Rev Dust (ppb) | None | 15 | 15 | 15 |
| PHENOSEAL ™ Fine Grade (ppb) | None | None | None | 30 |

[1]Taken from Example 3.
[2]A polymeric suspending aid, commercially available as "TEMPURUS ™" suspending agent from Baroid Drilling Fluids, Houston, TX, was added to Sample No. 14 in an amount of 18.5 ppb.

The results of the tests utilizing the above-described sample lost circulation treatment fluids are provided in Table 8. The resulted listed for Sample Lost Circulation Treatment Fluids in Table 8 are from Example 3 and are listed in Table 8 for comparative purposes.

TABLE 8

| Sample Lost Circulation Treatment Fluid | Simulated Fracture Width, mm → mm | Forward Flow Test Results | | Reverse Flow Test Results | |
|---|---|---|---|---|---|
| | | Applied Pump Pressure (psi) | Maximum Pressure Measured at the Core Face (psi) | Fluid | Maximum Pressure Measured at the Core Face (psi) |
| No. 13 | 3 → 1.8 | 0 | Failure at 0 psi pump pressure. | N/A | N/A |
| No. 14 | 3 → 1.8 | 0 | Failure at 0 psi pump pressure. | N/A | N/A |
| No. 15 | 3 → 1.8 | 2500 | Failure at 1440 psi[1] pump pressure. | N/A | N/A |

[1]Average taken across two tests.

Therefore, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A method of controlling lost circulation comprising contacting a lost circulation zone in a subterranean formation with a lost circulation composition having at least a trimodal particle size distribution, the lost circulation composition comprising:
   a first portion of particles having a weight mean particle size of less than about 20 microns;
   a second portion of particles having a weight mean particle size in the range of from about 25 microns to about 400 microns; and
   a third portion of particles having a weight mean particle size in the range of from about 450 microns to about 1,500 microns;
   wherein resilient particles, particles comprising a thermoset polymer laminate, or a combination thereof are present in the lost circulation composition in an amount of at least about 20% by weight of the lost circulation composition; and
   wherein the first portion of particles fills at least a plurality of interstices between at least one of the second and third portion of particles, and wherein the second portion of particles fills at least a plurality of interstices between the third portion of particles.

2. The method of claim 1 wherein the resilient particles comprise at least one resilient particle selected from the group consisting of: a resilient carbon-based material and an elastomeric styrene butadiene copolymer.

3. The method of claim 1 wherein the resilient particles comprise a carbon-based material comprising graphite and a carbon matrix.

4. The method of claim 3 wherein the graphite is present in the resilient carbon-based material in an amount of at least about 20% by weight.

5. The method of claim 1 wherein the resilient particles are present in the lost circulation composition in an amount of at least about 20% by weight of the lost circulation composition.

6. The method of claim 1 wherein at least a portion of the particles comprising the thermoset polymer laminate are in the form of platelets.

7. The method of claim 1 wherein the thermoset polymer laminate comprises at least one thermoset polymer laminate selected from the group consisting of: a melamine-formaldehyde type thermoset polymer, a urea-formaldehyde type thermoset polymer, and a combination thereof.

8. The method of claim 1 where the particles comprising the thermoset polymer laminate are present in the lost circulation composition in an amount of at least about 20% by weight of the lost circulation composition.

9. The method of claim 1 wherein the first portion of particles comprises at least one selected from the group consisting of: minerals, thermoset polymer laminates, carbon based materials comprising graphite and a carbon matrix, ground battery casings, ground tires, ground nut shells, sized-calcium carbonate, petroleum coke, vitrified shale, calcium clay, glass, mica, ceramics, polymeric materials, synthetic materials, and a mixture thereof.

10. The method of claim 1 wherein the first portion of particles comprises at least one selected from the group consisting of: calcium montmorrillonite clay, kaolinite, attapulgite, zeolite, silica, and a combination thereof.

11. The method of claim 1 wherein the first portion of particles comprises resilient particles.

12. The method of claim 11 wherein the resilient particles are present in the first portion of particles in an amount of at least about 30% by weight of the first portion.

13. The method of claim 1 wherein the second portion of particles have a weight mean particle size in the range of from about 75 microns to about 350 microns.

14. The method of claim 1 wherein the second portion of particles comprises at least one selected from the group consisting of: minerals, thermoset polymer laminates, carbon based materials comprising graphite and a carbon matrix, ground battery casings; ground tires, ground nut shells, sized-calcium carbonate, petroleum coke, vitrified shale, calcium clay, glass, mica, ceramics, polymeric materials, synthetic materials, and a mixture thereof.

15. The method of claim 1 wherein resilient particles, particles comprising a thermoset polymer laminate, or a combination thereof are present in the second portion of particles in an amount of at least about 30% by weight of the second portion.

16. The method of claim 1 wherein the second portion of particles comprises resilient particles.

17. The method of claim 1 wherein the second portion of particles comprises particles comprising a thermoset polymer laminate.

18. The method of claim 1 wherein the third portion of particles have a weight mean particle size in the range of from about 450 microns to about 800 microns.

19. The method of claim 1 wherein resilient particles, particles comprising a thermoset polymer laminate, or a combination thereof are present in the third portion of particles in an amount at least about 30% by weight of the third portion.

20. The method of claim 1 wherein the third portion of particles comprises at least one selected from the group consisting of: minerals, thermoset polymer laminates, carbon based materials comprising graphite and a carbon matrix, ground battery casings, ground tires, ground nut shells, sized-calcium carbonate, petroleum coke, vitrified shale, calcium clay, glass, mica, ceramics, polymeric materials, synthetic materials, and a mixture thereof.

21. The method of claim 1 wherein the third portion of particles comprises sized-calcium carbonate.

22. The method of claim 1 where the third portion of particles comprises particles comprising a thermoset polymer laminate.

23. A method of controlling lost circulation comprising adding to a fluid a lost circulation composition having at least a trimodal particle size distribution, the lost circulation composition comprising:
   a first portion of particles having a weight mean particle size of less than about 20 microns;
   a second portion of particles having a weight mean particle size in the range of from about 25 microns to about 400 micron; and
   a third portion of particles having a weight mean particle size in the range of from about 450 microns to about 1,500 microns;
   wherein resilient particles, particles comprising a thermoset polymer laminate, or a combination thereof are present in the lost circulation composition in an amount of at least about 20% by weight of the lost circulation composition.

24. The method of claim 23 wherein the fluid is a drilling fluid, a lost circulation treatment fluid, a spacer fluid, or a completion fluid.

25. The method of claim 23 wherein the lost circulation composition is added to the fluid in an amount of less than about 100 pounds per barrel of the fluid.

26. The method of claim 23 further comprising contacting a portion of the subterranean formation with the fluid.

27. The method of claim 23 wherein the resilient particles comprise at least one resilient particle selected from the group consisting of: a resilient carbon-based material and an elastomeric styrene butadiene copolymer.

28. The method of claim 23 wherein the resilient particles are present in the lost circulation composition in an amount of at least about 20% by weight of the lost circulation composition.

29. The method of claim 23 wherein at least a portion of the particles comprising the thermoset polymer laminate are in the form of platelets.

30. The method of claim 23 wherein the thermoset polymer laminate comprises at least one selected from the group consisting of: a melamine-formaldehyde type thermoset polymer, a urea-formaldehyde type thermoset polymer, and a combination thereof.

31. The method of claim 23 where the particles comprising the thermoset polymer laminate are present in the lost circulation composition in an amount of at least about 20% by weight of the lost circulation composition.

32. A method of increasing an effective fracture gradient in a portion of a subterranean formation while drilling a well bore that penetrates the portion of the subterranean formation, the method comprising:
   providing a fluid that comprises a lost circulation composition having at least a trimodal particle size distribution, the lost circulation composition comprising:
   a first portion of particles having a weight mean particle size of less than about 20 microns,
   a second portion of particles having a weight mean particle size in the range of from about 25 microns to about 400 microns, and
   a third portion of particles having a weight mean particle size in the range of from about 450 microns to about 1,500 microns,
   wherein resilient particles selected from the group consisting of a resilient carbon-based material comprising graphite and a carbon matrix, an elastomeric styrene butadiene copolymer, and a combination thereof; particles comprising a thermoset polymer laminate; or a combination thereof are present in the lost circulation composition in an amount of at least about 20% by weight of the lost circulation composition;
   placing the fluid into the well bore; and
   allowing the fluid to contact the portion of the subterranean formation penetrated by the well bore.

33. The method of claim 32 wherein the lost circulation composition is added to the fluid in an amount of less than about 100 pounds per barrel of the fluid.

34. The method of claim 32 wherein the resilient particles are present in the lost circulation composition in an amount of at least about 20% by weight of the lost circulation composition.

35. The method of claim 32 wherein at least a portion of the particles comprising the thermoset polymer laminate are in the form of platelets.

36. The method of claim 32 wherein the particles comprising the thermoset polymer laminate are present in the lost circulation composition in an amount of at least about 20% by weight of the lost circulation composition.

37. The method of claim 32 wherein the first portion of particles comprises at least one selected from the group consisting of: minerals, thermoset polymer laminates, carbon based materials comprising graphite and a carbon matrix, ground battery casings, ground tires, ground nut shells, sized-calcium carbonate, petroleum coke, vitrified shale, calcium clay, glass, mica, ceramics, polymeric materials, synthetic materials, and a mixture thereof.

38. The method of claim 32 wherein the first portion of particles comprises resilient particles.

39. The method of claim 38 wherein the resilient particles comprises at least one resilient particle selected from the group consisting of: a resilient carbon-based material and an elastomeric styrene butadiene copolymer.

40. The method of claim 32 wherein the second portion of particles comprises at least one selected from the group consisting of: minerals, thermoset polymer laminates, carbon based materials comprising graphite and a carbon matrix, ground battery casings, ground tires, ground nut shells, sized-calcium carbonate, petroleum coke, vitrified shale, calcium clay, glass, mica, ceramics, polymeric materials, synthetic materials, and a mixture thereof.

41. The method of claim 32 wherein resilient particles, particles comprising a thermoset polymer laminate, or a combination thereof are present in the second portion of particles in an amount of at least about 30% by weight of the second portion.

42. The method of claim 32 wherein the second portion of particles comprises resilient particles.

43. The method of claim 42 wherein the resilient particles comprise at least one resilient particle selected from the group consisting of: a resilient carbon-based material and an elastomeric styrene butadiene copolymer.

44. The method of claim 32 wherein the second portion of particles comprises particles comprising a thermoset polymer laminate.

45. The method of claim 32 wherein resilient particles, particles comprising a thermoset polymer laminate, or a combination thereof are present in the third portion of particles in an amount of at least about 30% by weight of the third portion.

46. The method of claim 32 wherein the third portion of particles comprises at least one selected from the group consisting of: minerals, thermoset polymer laminates, carbon based materials comprising graphite and a carbon matrix, ground battery casings, ground tires, ground nut shells, sized-calcium carbonate, petroleum coke, vitrified shale, calcium clay, glass, mica, ceramics, polymeric materials, synthetic materials, and a mixture thereof.

47. The method of claim 32 where the third portion of particles comprises particles comprising a thermoset polymer laminate.

48. The method of claim 32 wherein the resilient particles are added to the fluid in an amount of at least 15 pounds per barrel.

49. A method of controlling lost circulation comprising:
providing a fluid that comprises a lost circulation composition having at least a trimodal particle size distribution, the lost circulation composition comprising:
a first portion of particles having a weight mean particle size of less than about 20 microns,
a second portion of particles having a weight mean particle size in the range of from about 25 microns to about 400 microns, and
a third portion of particles having a weight mean particle size in the range of from about 450 microns to about 1,500 microns,
wherein resilient particles, particles comprising a thermoset polymer laminate, or a combination thereof are present in the lost circulation composition in an amount of at least about 20% by weight of the lost circulation composition;
placing the fluid into a well bore; and
allowing the fluid to contact a lost circulation zone penetrated by the well bore.

50. The method of claim 49 wherein the resilient particles comprise at least one resilient particle selected from the group consisting of: a resilient carbon-based material and an elastomeric styrene butadiene copolymer.

51. The method of claim 49 wherein the resilient particles are present in the lost circulation composition in an amount of at least about 20% by weight of the lost circulation composition.

52. The method of claim 49 where the particles comprising the thermoset polymer laminate are present in the lost circulation composition in an amount of at least about 20% by weight of the lost circulation composition.

53. The method of claim 49 wherein the resilient particles are added to the fluid in an amount of at least 15 pounds per barrel.

* * * * *